United States Patent
Kim et al.

(10) Patent No.: US 11,662,718 B2
(45) Date of Patent: May 30, 2023

(54) METHOD FOR SETTING MODEL THRESHOLD OF FACILITY MONITORING SYSTEM

(71) Applicant: BISTelligence, Inc., Seoul (KR)

(72) Inventors: Donghwan Kim, Seoul (KR); Daeyoung Kim, Seoul (KR); Hyuk Jun Na, Seoul (KR); Kyoung Shik Jun, Seoul (KR); Woonkyu Choi, Seoul (KR)

(73) Assignee: BISTelligence, Inc., Seoul (KR)

( * ) Notice: Subject to any disclaimer, the term of this patent is extended or adjusted under 35 U.S.C. 154(b) by 167 days.

(21) Appl. No.: 17/136,391

(22) Filed: Dec. 29, 2020

(65) Prior Publication Data

US 2022/0171376 A1 Jun. 2, 2022

(30) Foreign Application Priority Data

Nov. 30, 2020 (KR) .................. 10-2020-0164006

(51) Int. Cl.
*G05B 19/02* (2006.01)
*G05B 23/02* (2006.01)
(Continued)

(52) U.S. Cl.
CPC ..... *G05B 23/0235* (2013.01); *G05B 19/4183* (2013.01); *G05B 19/4185* (2013.01);
(Continued)

(58) Field of Classification Search
CPC .......... G05B 19/41885; G05B 19/4185; G05B 23/0235; G06K 9/6256; G06N 3/08;
(Continued)

(56) References Cited

U.S. PATENT DOCUMENTS

2018/0359606 A1\* 12/2018 Bieniasz-Krzywiec ..................... H04W 4/021
2019/0286506 A1 9/2019 Cheng et al.
(Continued)

FOREIGN PATENT DOCUMENTS

CN 109408552 A 3/2019
JP 2007198918 A 8/2007
(Continued)

OTHER PUBLICATIONS

Dagnino et al., CN 104919384 "For Evaluation of Equipment Maintenance and/or Reduce Risk of Electric System Device", (translation), Sep. 18, 2018, 18 pgs <CN_104919384.pdf >.\*
(Continued)

*Primary Examiner* — Tuan A Vu
(74) *Attorney, Agent, or Firm* — Umberg Zipser LLP; Ryan Dean

(57) ABSTRACT

An exemplary embodiment of the present disclosure discloses a method of setting a model threshold value for detecting an anomaly of a facility monitoring system, the method including: acquiring sensor data output from each sensor; extracting a feature value for the sensor data of each sensor; acquiring output data by inputting input data including the extracted feature value to a trained neural network model; and comparing the input data and the output data and setting a threshold value for detecting an anomaly based on a calculated comparison result value.

15 Claims, 6 Drawing Sheets

(51) Int. Cl.
  *G05B 19/418* (2006.01)
  *G06N 3/08* (2023.01)
  *G06F 18/214* (2023.01)
  *G06F 8/61* (2018.01)
  *G06N 3/088* (2023.01)

(52) U.S. Cl.
  CPC ..... *G05B 19/41885* (2013.01); *G06F 18/214* (2023.01); *G06N 3/08* (2013.01); *G06F 8/61* (2013.01); *G06N 3/088* (2013.01)

(58) Field of Classification Search
  CPC ......... G06N 3/088; H04W 4/021; G06F 8/61; G06F 18/214
  See application file for complete search history.

(56) References Cited

U.S. PATENT DOCUMENTS

| | | | |
|---|---|---|---|
| 2020/0272899 A1* | 8/2020 | Dunne | G06F 8/61 |
| 2020/0379454 A1* | 12/2020 | Trinh | G06N 3/088 |
| 2020/0410350 A1 | 12/2020 | Yoon et al. | |

FOREIGN PATENT DOCUMENTS

| | | |
|---|---|---|
| KR | 1020120074630 A | 7/2012 |
| KR | 1020180078622 A | 7/2018 |
| KR | 102027389 B1 | 10/2019 |
| KR | 1020200010984 A | 1/2020 |
| KR | 1020200087299 A | 7/2020 |

OTHER PUBLICATIONS

Korean Patent Office; Office Action, dated Mar. 24, 2021, 7 pages.

\* cited by examiner

METHOD FOR SETTING MODEL THRESHOLD OF FACILITY MONITORING SYSTEM

CROSS-REFERENCE TO RELATED APPLICATIONS

This application claims priority to and the benefit of Korean Patent Application No. 10-2020-0164006 filed in the Korean Intellectual Property Office on Nov. 30, 2020, the entire contents of which are incorporated herein by reference.

TECHNICAL FIELD

The present disclosure relates to factory automation, and more particularly, to a method of setting a model threshold value of a facility monitoring system.

BACKGROUND ART

In general, manufacturing facilities in the manufacturing industry are exposed to the risk of failure, and the risk of failure may increase as the usage time increases. Accordingly, sudden manufacturing interruption due to failure of manufacturing facilities may cause significant economic losses. Therefore, in order to prevent such a problem in the field, it is necessary to recognize the condition of the facility in advance and carry out preventive repairs before a breakdown in the facility occurs.

However, it is difficult to determine the cause of the facility failure and it goes through a process of analyzing measurement data of a facility component by relying on an expert, so that there is difficulty in that a lot of cost and time are spent on follow-up measures.

Accordingly, there is a demand to develop a technology for diagnosing failure of manufacturing facilities and predicting the remaining useful life by using a neural network model.

Korean Patent Application Laid-Open No. 10-2012-0074630 discloses a method and a system for establishing a decision tree for predicting facility abnormality.

SUMMARY OF THE INVENTION

The present disclosure is conceived in response to the background art, and has been made in an effort to provide a method of setting a model threshold value for detecting anomaly of a facility monitoring system.

An exemplary embodiment of the present disclosure for solving the problem discloses a method of setting a model threshold value for detecting anomaly of a facility monitoring system, the method including: acquiring sensor data output from each sensor; extracting a feature value for the sensor data of each sensor; acquiring output data by inputting input data including the extracted feature value to a trained neural network model; and comparing the input data and the output data and setting a threshold value for detecting anomaly based on a calculated comparison result value.

In an alternative exemplary embodiment of the method of setting the threshold value, the acquiring of the sensor data may include acquiring the sensor data for each device when sensor data having at least one variable is output from each sensor that senses an operation of a device.

In the alternative exemplary embodiment of the method of setting the threshold value, the extracting of the feature value for the sensor data of each sensor may include searching for device state information for the sensor data of each sensor and extracting a feature value of each sensor in a unit of the device state information.

In the alternative exemplary embodiment of the method of setting the threshold value, the extracting of the feature value for the sensor data of each sensor may include generating model input values for the number of cases having a feature value for a device state in a unit of a variable included in the sensor data.

In the alternative exemplary embodiment of the method of setting the threshold value, the extracting of the feature value for the sensor data of each sensor may include, when N device state types are set, generating a model input value for the number of cases having feature values corresponding to the N device state types in a unit of the variable.

In the alternative exemplary embodiment of the method of setting the threshold value, the N device state types may be set with user setting values or automatically set through machine learning based on time series data for a predetermined time.

In the alternative exemplary embodiment of the method of setting the threshold value, the extracting of the feature value for the sensor data of each sensor may include extracting a feature value of each sensor from device state information for the sensor data output from each sensor for a predetermined time.

In the alternative exemplary embodiment of the method of setting the threshold value, the extracting of the feature value for the sensor data of each sensor may include extracting the feature value of each sensor from the device state information of the sensor data included in a normal range among the sensor data output from each sensor.

In the alternative exemplary embodiment of the method of setting the threshold value, the extracting of the feature value for the sensor data of each sensor may include extracting the feature value including an upper limit value corresponding to an Upper Control Limit (UCL) and a lower limit value corresponding to a Lower Control Limit (LCL) in a range of a control limit for the device state feature among the sensor data output from each sensor.

In the alternative exemplary embodiment of the method of setting the threshold value, the extracting of the feature value for the sensor data of each sensor may include extracting the feature value of at least one of an upper limit value, a lower limit value, a mean, standard deviation, covariance for the sensor data output from each sensor.

In the alternative exemplary embodiment of the method of setting the threshold value, the acquiring of the output data by inputting the input data including the extracted feature value to the trained neural network model may include acquiring the output data by inputting the input data to the trained autoencoder-based neural network model.

In the alternative exemplary embodiment of the method of setting the threshold value, the comparing of the input data and the output data and the setting of the threshold value for detecting an anomaly based on the calculated comparison result value may include setting the largest comparison result value among the calculated comparison result values as an initial threshold value for detecting anomaly.

In the alternative exemplary embodiment of the method of setting the threshold value, the comparing of the input data and the output data and the setting of the threshold value for detecting anomaly based on the calculated comparison result value may include setting a user set value selected from the calculated comparison result values as an initial threshold value for detecting an anomaly.

In the alternative exemplary embodiment of the method of setting the threshold value, the user setting value may be any one of a maximum value, a mean, and a minimum value among the calculated comparison result values.

In the alternative exemplary embodiment of the method of setting the threshold value, the comparison result value calculated by comparing the input data and the output data may be calculated based on a reconstruction error of the input data and the output data.

In the alternative exemplary embodiment of the method of setting the threshold value, the comparison result value calculated by comparing the input data and the output data may include a Health Index (HI) indicating a device state index.

In the alternative exemplary embodiment of the method of setting the threshold value, the set threshold value may be set for each device.

Another exemplary embodiment of the present disclosure provides a computer program stored in a computer readable storage medium, wherein when the computer program is executed by one or more processors, the computer program performs following operations for setting a model threshold value, the operations including: acquiring sensor data output from each sensor; extracting a feature value for the sensor data of each sensor; acquiring output data by inputting input data including the extracted feature value to a trained neural network model; and comparing the input data and the output data and setting a threshold value for detecting an anomaly based on a calculated comparison result value.

Still another exemplary embodiment of the present disclosure provides a computing device for providing a method of setting a model threshold value, the computing device including: a processor including one or more cores; and a memory, in which the processor acquires sensor data output from each sensor, extracts a feature value for the sensor data of each sensor, acquires output data by inputting input data including the extracted feature value to a trained neural network model, and compares the input data and the output data and sets a threshold value for detecting an anomaly based on a calculated comparison result value.

The present disclosure may provide the method of setting a model threshold value for detecting an anomaly of a facility monitoring system.

BRIEF DESCRIPTION OF THE DRAWINGS

Some of the exemplary embodiments are illustrated in the accompanying drawings so that the features of the present disclosure mentioned above may be understood in detail with more specific description with reference to the following exemplary embodiments. Further, similar reference numerals in the drawings are intended to refer to the same or similar functions over several aspects. However, it should be noted that the accompanying drawings show only specific exemplary embodiments of the present disclosure, and are not considered to limit the scope of the present disclosure, and other exemplary embodiments having the same effect may be sufficiently recognized.

DETAILED DESCRIPTION

Figure 1:
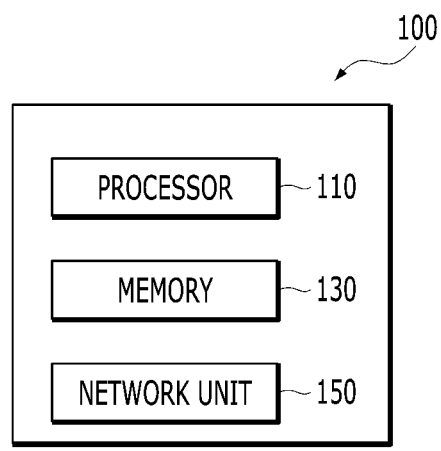
FIG. 1 is a block diagram illustrating a computing device performing operations for providing a method of setting a model threshold value according to an exemplary embodiment of the present disclosure.

Various exemplary embodiments are described with reference to the drawings. In the present specification, various descriptions are presented for understanding the present disclosure. However, it is obvious that the exemplary embodiments may be carried out even without a particular description.

Terms, "component", "module", "system", and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a server and the server may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

A term "or" intends to mean comprehensive "or", not exclusive "or". That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

A term "include" and/or "including" shall be understood as meaning that a corresponding characteristic and/or a constituent element exists. However, a term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

The term "at least one of A and B" should be interpreted to mean "a case including only A", "a case including only B", and "a case where A and B are combined".

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, it shall not be construed that the determinations of the implementation deviate from the range of the contents of the present disclosure.

The description about the presented exemplary embodiments is provided so as for those skilled in the art to use or carry out the present disclosure. Various modifications of the exemplary embodiments will be apparent to those skilled in the art. General principles defined herein may be applied to other exemplary embodiments without departing from the scope of the present disclosure. Therefore, the present disclosure is not limited to the exemplary embodiments presented herein. The present disclosure shall be interpreted within the broadest meaning range consistent to the principles and new characteristics presented herein.

Throughout the present specification, a neural network, a nerve network, and a network function may be used as the same meaning. The neural network may consist of a set of interconnected computational units, which may generally be referred to as "nodes". The "nodes" may also be called "neurons". The neural network consists of at least two nodes. The nodes (or neurons) configuring the neural networks may be interconnected by one or more "links".

In the neural network, two or more nodes connected through the link may relatively form a relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node may be determined based on data input to the input node. Herein, a node connecting the input node and the output node may have a weight. The weight is variable, and in order for the neural network to perform a desired function, the weight may be varied by a user or an algorithm. For example, when one or more input nodes are connected to one output node by links, respectively, a value of the output node may be determined based on values input to the input nodes connected to the output node and weights set in the link corresponding to each of the input nodes.

As described above, in the neural network, two or more nodes are connected with each other through one or more links to form a relationship of an input node and an output node in the neural network. A characteristic of the neural network may be determined according to the number of nodes and links in the neural network, a correlation between the nodes and the links, and a value of the weight assigned to each of the links. For example, when there are two neural networks in which the numbers of nodes and links are the same and the weights between the links are different, the two neural networks may be recognized to be different from each other.

FIG. 1 is a block diagram illustrating a computing device performing operations for providing a method of setting a model threshold value according to an exemplary embodiment of the present disclosure.

The configuration of a computing device 100 illustrated in FIG. 1 is merely a simplified example. In the exemplary embodiment of the present disclosure, the computing device 100 may include other configurations for performing a computing environment of the computing device 100, and only some of the disclosed configurations may also configure the computing device 100.

The computing device 100 may include a processor 110, a memory 130, and a network unit 150.

In the present disclosure, the processor 110 may set a model initial threshold value for detecting an anomaly of a facility monitoring system.

According to the exemplary embodiment of the present disclosure, the processor 110 may acquire sensor data output from each sensor, extract a feature value for the sensor data of each sensor, acquire output data by inputting input data including the extracted feature value to a trained neural network model, and compare the input data with the output data to set a threshold value for detecting an anomaly based on the calculated comparison result value.

According to the exemplary embodiment of the present disclosure, the sensor data may include variables having various values for each sensor. For example, the sensor is for measuring quality, performance, or failure of facilities or devices for performing factory automation, and may include a predetermined sensor, such as a proximity sensor, a capacitance sensor, a tilt angle sensor, an acceleration sensor, an ultrasonic sensor, a photo sensor, a vision sensor, or a stability sensor. For example, the sensor data may include data or values acquired from the foregoing sensors, and may include sensor data including various types of variables according to the type of sensor or the type of equipment or facility measured by the sensor. The foregoing matter is merely an example, and the present disclosure is not limited thereto.

According to the exemplary embodiment of the present disclosure, when the processor 110 acquires the sensor data, the processor 110 may acquire the sensor data having at least one variable output from each sensor which senses an operation of a device for each device.

According to the exemplary embodiment of the present disclosure, when the processor 110 extracts the feature value for the sensor data of each sensor, the processor 110 may search for device state information for the sensor data of each sensor and extract the feature value of each sensor in the unit of the device state information.

According to the exemplary embodiment of the present disclosure, when the processor 110 extracts the feature value for the sensor data of each sensor, the processor 110 may generate model input values for the number of cases having a feature value for a device state in the unit of the variable included in the sensor data.

According to the exemplary embodiment of the present disclosure, when N device state types are set when the processor 110 extracts the feature value for the sensor data of each sensor, the processor 110 may generate a model input value for the number of cases having feature values corresponding to N device state types in the unit of the variable. For example, when the N device state types are set, the processor 110 may set three initial values. The foregoing matter is merely an example, and the present disclosure is not limited thereto.

Depending on the case, when the N device state types are set, the processor 110 may also set the initial value with a user setting value, or the initial value may be automatically set by machine learning based on time series data for a predetermined time.

According to the exemplary embodiment of the present disclosure, when the processor 110 extracts the feature value for the sensor data of each sensor, the processor 110 may extract the feature value of each sensor from device state information for the sensor data output from each sensor for a predetermined time. The foregoing matter is merely an example, and the present disclosure is not limited thereto.

According to the exemplary embodiment of the present disclosure, when the processor 110 extracts the feature value for the sensor data of each sensor, the processor 110 may extract the feature value of each sensor from device state information of the sensor data included in a normal range among the sensor data output from each sensor. The foregoing matter is merely an example, and the present disclosure is not limited thereto.

According to the exemplary embodiment of the present disclosure, when the processor 110 extracts the feature value for the sensor data of each sensor, the processor 110 may extract the feature value including an upper limit value corresponding to an Upper Control Limit (UCL) and a lower limit value corresponding to a Lower Control Limit (LCL) in the range of a control limit for the device state feature among the sensor data output from each sensor. The foregoing matter is merely an example, and the present disclosure is not limited thereto.

According to the exemplary embodiment of the present disclosure, when the processor 110 extracts the feature value for the sensor data of each sensor, the processor 110 may extract the feature value of at least one of an upper limit value, a lower limit value, a mean, standard deviation, covariance for the sensor data output from each sensor.

According to the exemplary embodiment of the present disclosure, when the processor 110 acquires the output data by inputting the input data including the extracted feature value to the trained neural network model, the number of elements of the input data may be the same as the number of elements of the output data. The foregoing matter is merely an example, and the present disclosure is not limited thereto.

According to the exemplary embodiment of the present disclosure, when the processor 110 acquires the output data by inputting the input data including the extracted feature value to the trained neural network model, the processor 110 may acquire the output data by inputting the input data to the trained autoencoder-based neural network model. The foregoing matter is merely an example, and the present disclosure is not limited thereto.

According to the exemplary embodiment of the present disclosure, the neural network model may also include an autoencoder. The auto encoder may be one type of artificial neural network for outputting output data similar to input data. The auto encoder may include at least one hidden layer, and the odd-numbered hidden layers may be disposed between the input/output layers. The number of nodes of each layer may decrease from the number of nodes of the input layer to an intermediate layer called a bottleneck layer (encoding), and then be expanded symmetrically with the decrease from the bottleneck layer to the output layer (symmetric with the input layer). The nodes of a dimension reduction layer may or may not be symmetrical to the nodes of a dimension restoration layer. The auto encoder may perform a nonlinear dimension reduction. The number of input layers and the number of output layers may correspond to the number of sensors left after preprocessing of the input data. In the auto encoder structure, the number of nodes of the hidden layer included in the encoder decreases as a distance from the input layer increases. When the number of nodes of the bottleneck layer (the layer having the smallest number of nodes located between the encoder and the decoder) is too small, the sufficient amount of information may not be transmitted, so that the number of nodes of the bottleneck layer may be maintained in a specific number or more (for example, a half or more of the number of nodes of the input layer and the like).

According to the exemplary embodiment of the present disclosure, when the processor 110 compares the input data and the output data and sets the threshold value for detecting an anomaly based on the calculated comparison result value, the processor 110 may set the largest comparison result value among the calculated comparison result values as an initial threshold value for detecting an anomaly. The foregoing matter is merely an example, and the present disclosure is not limited thereto.

According to the exemplary embodiment of the present disclosure, when the processor 110 compares the input data and the output data and sets the threshold value for detecting an anomaly based on the calculated comparison result value, the processor 110 may set a user setting value selected from the calculated comparison result values as an initial threshold value for detecting an anomaly. For example, the user setting value may be any one of a maximum value, a mean, and a minimum value among the calculated comparison result values. The foregoing matter is merely an example, and the present disclosure is not limited thereto.

According to the exemplary embodiment of the present disclosure, the comparison result value calculated by comparing the input data and the output data may be calculated based on a reconstruction error of the input data and the output data. The foregoing matter is merely an example, and the present disclosure is not limited thereto.

According to the exemplary embodiment of the present disclosure, the comparison result value calculated by comparing the input data and the output data may include a Health Index (HI) indicating a device state index. The foregoing matter is merely an example, and the present disclosure is not limited thereto.

According to the exemplary embodiment of the present disclosure, the set threshold value may be set for each device.

According to the exemplary embodiment of the present disclosure, in the case where facility abnormality is detected and a failure type is classified during facility monitoring, when an event in which a current failure class is the same as a past failure class occurs, the processor 110 may update the set threshold value. According to the exemplary embodiment of the present disclosure, when the current failure class is the same as the past failure class as a result of the failure diagnosis, the processor 110 may extract a past threshold value of the neural network model corresponding to the past failure class. According to the exemplary embodiment of the present disclosure, when the current failure class is the same as the past failure class, the processor 110 may calculate a new threshold value based on a past threshold value of the neural network model corresponding to the past failure class and a past median value of HIs corresponding to a normal section, a current threshold value of the neural network model corresponding to the current failure class and a current median value of the HIs corresponding to the normal section, and a correction value for failure cost to update the existing threshold value to the new threshold value. For example, in the case where the past median value is one when the new threshold value is calculated, the processor 110 may calculate the new threshold value with an Equation, New threshold value=(1/reciprocal of difference value between past median value and current median value)×(reciprocal for difference value between past median value and current median value×past threshold value corresponding to past median value)×correction value. For another example, in the case where the number of past median values is plural when the new threshold value is calculated, the processor 110 may calculate the new threshold value with an Equation, New threshold value=(1/reciprocal for difference value between first past median value and current median value+reciprocal for difference value between $N^{th}$ past median value and current median value)×{(reciprocal for difference value between first past median value and current median value×first past threshold value corresponding to first past median value)+(reciprocal for difference value between $N^{th}$ past median value and current median value×$N^{th}$ past threshold value corresponding to $N^{th}$ past median value)}×correction value.

Accordingly, even in the case where there is no past failure data, the present disclosure may set an initial threshold value of the model for detecting an anomaly, and is capable of updating a threshold value and effectively monitoring facilities even when various events, such as facility replacement and facility repair, occur.

As described above, the processor 110 may consist of one or more cores, and may include a processor, such as a Central Processing Unit (CPU), a General Purpose Graphics Processing Unit (GPGPU), and a Tensor Processing Unit (TPU) of the computing device 100, for an unstructured data analysis and deep learning. The processor 110 may perform a threshold value setting for detecting an anomaly of the facility monitoring system according to the exemplary embodiment of the present disclosure by reading a computer program stored in the memory 130. According to the exemplary embodiment of the present disclosure, the processor 110 may perform a computation for setting a threshold value. The processor 110 may perform a calculation, such as processing of input data for learning in Deep Learning (DN), extraction of a feature from input data, an error calculation, and updating of a weight of the neural network by using backpropagation, for training the neural network. At least one of the CPU, GPGPU, and TPU of the processor 110 may process training of the network function. For example, the CPU and the GPGPU may process the training of the network function and the setting of the threshold value by using a network function together. Further, according to the exemplary embodiment of the present disclosure, the training of the network function and the setting of the threshold value by using the network function may be processed by using the processors of the plurality of computing devices together. Further, the computer program executed in the computing device according to the exemplary embodiment of the present disclosure may be a CPU, GPGPU, or TPU executable program.

According to the exemplary embodiment of the present disclosure, the memory 130 may store a predetermined form of information generated or determined by the processor 110 and a predetermined form of information received by the network unit 150.

According to the exemplary embodiment of the present disclosure, the memory 130 may include at least one type of storage medium among a flash memory type, a hard disk type, a multimedia card micro type, a card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. The computing device 100 may also be operated in relation to web storage performing a storage function of the memory 130 on the Internet. The description of the foregoing memory is merely illustrative, and the present disclosure is not limited thereto.

According to the exemplary embodiment of the present disclosure, the network unit 150 may transceive data and the like for performing the setting of the threshold value for detecting an anomaly of the facility monitoring system with another computing device, server, and the like. The network unit 150 may transceive data inferred for performing the setting of the threshold value for detecting the anomaly of the facility monitoring system with another computing device, server, and the like. Further, the network unit 150 may enable the plurality of computing devices to communicate with each other, so that the training of the network function is distributed and performed in each of the plurality of computing devices. The network unit 150 may enable the plurality of computing devices to communicate with each other, so that analyzed data generation by using the network function is distributed and performed.

According to the exemplary embodiment of the present disclosure, the network unit 150 may be configured regardless of its communication mode, such as a wired mode and a wireless mode, and may be configured of various communication networks, such as a Personal Area Network (PAN) and a Wide Area Network (WAN). Further, the network unit 150 may be the publicly known World Wide Web (WWW), and may also use a wireless transmission technology used in PAN, such as Infrared Data Association (IrDA) or Bluetooth. The technologies described in the present specification may be used in other networks, as well as the foregoing networks.

As described above, the present disclosure acquire output data by inputting input data including an upper limit value and a lower limit value of the sensor data to the trained neural network model and compare the input data and the output data and set an initial threshold value for detecting an anomaly based on a calculated HI.

The present disclosure may set an initial threshold value through a process of acquiring sensor data output from each sensor, a process of extracting an upper limit value and a lower limit value for the sensor data of each sensor, a process of acquiring output data by inputting input data including the extracted upper limit value and lower limit value to a trained neural network model, and a process of comparing the input data and the output data and setting a threshold value for detecting an anomaly based on a calculated HI to perform, based on the set initial threshold value, detection of an anomaly of the facility monitoring system usable when there is no failure data.

Figure 2:
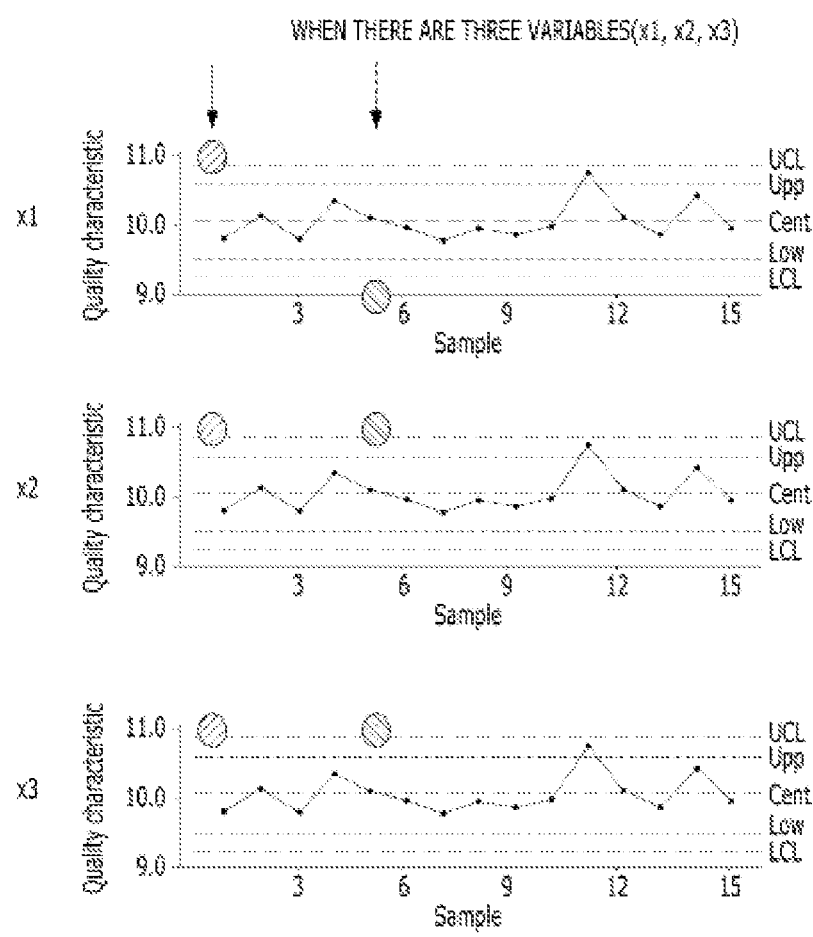
FIGS. 2 and 3 are diagrams illustrating a method of setting a model initial threshold value according to the exemplary embodiment of the present disclosure.
Figure 3:
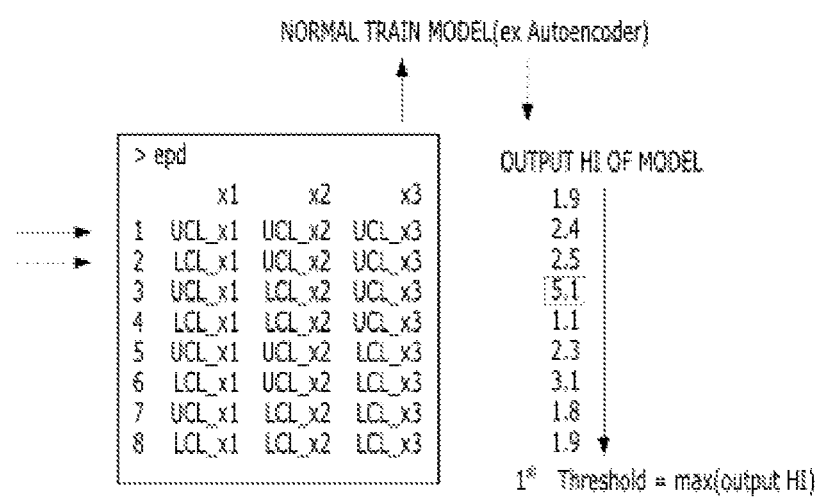

FIGS. 2 and 3 are diagrams illustrating a method of setting a model initial threshold value according to the exemplary embodiment of the present disclosure.

According to the exemplary embodiment of the present disclosure, the computing device 100 may set an initial threshold value in an Application Performance Management (APM) algorithm that is capable of performing anomaly detection through reconstruction error for n multi-input variables.

According to the exemplary embodiment of the present disclosure, the computing device 100 may generate model input values for the number of cases having a feature value for a device state in the unit of the variable included in the sensor data as illustrated in FIG. 2. For example, when the computing device 100 extracts the feature value for the sensor data of each sensor, the computing device 110 may extract the feature value including an upper limit value corresponding to a UCL and a lower limit value corresponding to an LCL in the range of a control limit for the device state feature among the sensor data output from each sensor. For another example, when the computing device 100 extracts the feature value for the sensor data of each sensor, the computing device 100 may extract the feature value of at least one of an upper limit value, a lower limit value, a mean, standard deviation, covariance for the sensor data output from each sensor.

According to the exemplary embodiment of the present disclosure, when N device state types are set, the computing device 100 may generate a model input value for the number of cases having feature values corresponding to the N device state types in the unit of the variable. For example, when the N device state types are set, the computing device 100 may set an initial value as 3. Depending on the case, when the N device status types are set, the computing device 100 may also set the device status type with a user setting value, or the device status type may be automatically set by machine learning based on time series data for a predetermined time.

According to the exemplary embodiment of the present disclosure, as illustrated in FIG. 3, the computing device 100 inputs the input data for each variable including the upper limit value corresponding to the UCL and the lower limit value corresponding to the LCL to the autoencoder-based model, the computing device 100 may calculate an HI indicating a device state index by comparing the input data and the output data.

Then, the computing device 100 may set the largest value among the HIs as the initial threshold value or at least one of a maximum value, a mean, and a minimum value as the initial threshold value according to user's preference.

FIG. 3 illustrates an example in which the largest value in the HIs, that is. 5.1 of the fourth case, is set as the initial threshold value.

However, depending on the case, according to a user's selection, the initial threshold value may also set through user's setting, such as a maximum value, a minimum value, and a mean.

Accordingly, even in the case where there is no past failure data, the present disclosure may set an initial threshold value of the model for detecting an anomaly, and is capable of updating a threshold value and effectively monitoring facilities even when various events, such as facility replacement and facility repair, occur.

Figure 4:
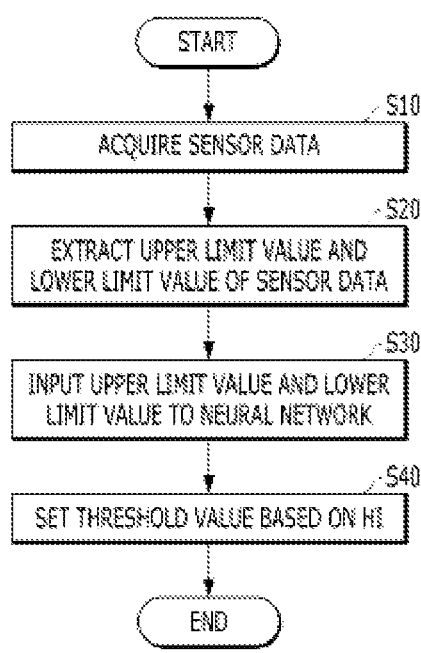
FIG. 4 is a flowchart illustrating a process of setting a model threshold value according to the exemplary embodiment of the present disclosure.

FIG. 4 is a flowchart illustrating a process of setting a model threshold value according to the exemplary embodiment of the present disclosure.

As illustrated in FIG. 4, the computing device of the present disclosure may acquire sensor data output from each sensor (S10). Herein, the sensor data may include variables having various values for each sensor. Further, the computing device of the present disclosure may acquire the sensor data having at least one variable output from each sensor which senses an operation of a device for each device.

The computing device of the present disclosure may extract a feature value for the sensor data of each sensor (S20). The computing device of the present disclosure may search for device state information for the sensor data of each sensor and extract the feature value of each sensor in the unit of the device state information. The computing device of the present disclosure may generate model input values for the number of cases having the feature value for the device state in the unit of the variable included in the sensor data. When N device state types are set, the computing device of the present disclosure may also generate a model input value for the number of cases having feature values corresponding to the N device state types in the unit of the variable. For example, in the N device state types, three initial values may be set. When the N device state types are set, the computing device of the present disclosure may also set the initial value with a user setting value, or the initial value may be automatically set by machine learning based on time series data for a predetermined time. The computing device of the present disclosure may extract the feature value of each sensor from device state information for the sensor data output from each sensor for a predetermined time. The computing device of the present disclosure may extract the feature value of each sensor from device state information of the sensor data included in a normal range among the sensor data output from each sensor. The computing device of the present disclosure may extract the feature value including an upper limit value corresponding to a UCL and a lower limit value corresponding to an LCL in the range of a control limit for the device state feature among the sensor data output from each sensor. Depending on the case, the computing device may extract the feature value of at least one of an upper limit value, a lower limit value, a mean, standard deviation, covariance for the sensor data output from each sensor.

The computing device of the present disclosure may acquire output data by inputting the input data including the extracted feature value to a trained neural network model (S30). The computing device of the present disclosure may acquire the output data by inputting the input data to the trained autoencoder-based neural network model.

The computing device of the present disclosure may compare the input data and the output data and set a threshold value for detecting an anomaly based on a calculated comparison result value (S40). The computing device of the present disclosure may set the largest comparison result value among the calculated comparison result values as an initial threshold value for detecting the anomaly. The computing device of the present disclosure may set a user setting value selected from the calculated comparison result values as an initial threshold value for detecting an anomaly. For example, the user setting value may be any one of a maximum value, a mean, and a minimum value among the calculated comparison result values. The computing device of the present disclosure may calculate the comparison result value based on a reconstruction error of the input data and the output data. The computing device of the present disclosure may calculate an HI indicating a device state index by comparing the input data and the output data. The computing device of the present disclosure may set the threshold value for each device.

Figure 5:
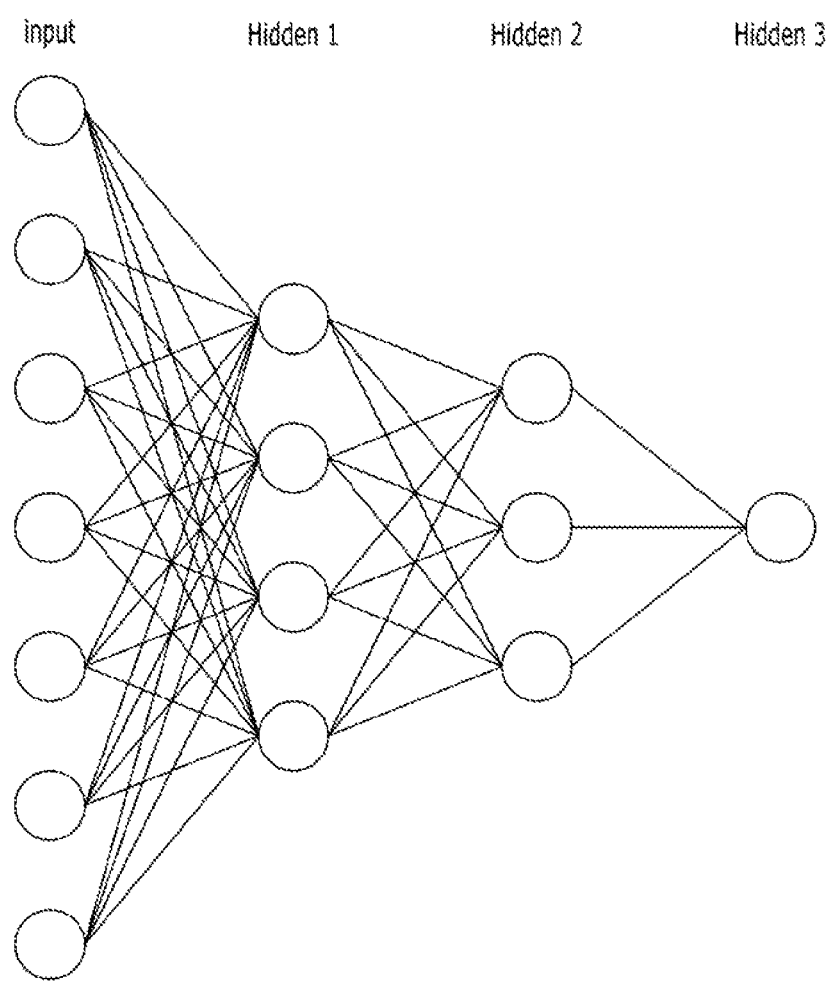
FIG. 5 is a diagram illustrating an example of a neural network that is a target of setting a model threshold value according to the exemplary embodiment of the present disclosure.

FIG. 5 is a diagram illustrating an example of a neural network that is a target of learning in the method of setting a model threshold value according to the exemplary embodiment of the present disclosure.

The neural network may be formed of a set of interconnected calculation units which are generally referred to as "nodes". The "nodes" may also be called "neurons". The neural network consists of one or more nodes. The nodes (or neurons) configuring the neural network may be interconnected by one or more links.

In the neural network, one or more nodes connected through the links may relatively form a relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node may be determined based on data input to the input node. Herein, a node connecting the input node and the output node may have a parameter. The parameter is variable, and in order for the neural network to perform a desired function, the parameter may be varied by a user or an algorithm. For example, when one or more input nodes are connected to one output node by links, respectively, a value of the output node may be determined based on values input to the input nodes connected to the output node and the parameter set in the link corresponding to each of the input nodes.

As described above, in the neural network, one or more nodes are connected with each other through one or more links to form a relationship of an input node and an output node in the neural network. A characteristic of the neural network may be determined according to the number of nodes and links in the neural network, a correlation between the nodes and the links, and a value of the parameter assigned to each of the links. For example, when there are two neural networks in which the numbers of nodes and links are the same and the parameter values between the links are different, the two neural networks may be recognized to be different from each other.

The neural network may consist of one or more nodes. Some of the nodes configuring the neural network may form one layer based on distances from an initial input node. For example, a set of nodes having a distance of n from an initial input node may form n layers. The distance from the initial input node may be defined by the minimum number of links, which need to be passed from the initial input node to a corresponding node. However, the definition of the layer is arbitrary for the description, and a degree of the layer in the neural network may be defined by a different method from the foregoing method. For example, the layers of the nodes may be defined by a distance from a final output node.

The initial input node may mean one or more nodes to which data is directly input without passing through a link in a relationship with other nodes among the nodes in the neural network. Otherwise, the initial input node may mean nodes which do not have other input nodes connected through the links in a relationship between the nodes based on the link in the neural network. Similarly, the final output node may mean one or more nodes which do not have an output node in a relationship with other nodes among the nodes in the neural network. Further, the hidden node may mean nodes configuring the neural network, not the initial input node and the final output node. In the neural network according to the exemplary embodiment of the present disclosure, the number of nodes of the input layer may be the same as the number of nodes of the output layer, and the neural network may be in the form that the number of nodes decreases and then increases again from the input layer to the hidden layer. Further, in the neural network according to another exemplary embodiment of the present disclosure, the number of nodes of the input layer may be smaller than the number of nodes of the output layer, and the neural network may be in the form that the number of nodes decreases from the input layer to the hidden layer. Further, in the neural network according to another exemplary embodiment of the present disclosure, the number of nodes of the input layer may be larger than the number of nodes of the output layer, and the neural network may be in the form that the number of nodes increases from the input layer to the hidden layer. The neural network according to another exemplary embodiment of the present disclosure may be the neural network in the form in which the foregoing neural networks are combined.

A deep neural network (DNN) may mean the neural network including a plurality of hidden layers, in addition to an input layer and an output layer. When the DNN is used, it is possible to recognize a latent structure of data.

In the exemplary embodiment of the present disclosure, the network function may include an auto encoder. The auto encoder may be one type of artificial neural network for outputting output data similar to input data. The auto encoder may include at least one hidden layer, and the odd-numbered hidden layers may be disposed between the input/output layers. The number of nodes of each layer may decrease from the number of nodes of the input layer to an intermediate layer called a bottleneck layer (encoding), and then be expanded symmetrically with the decrease from the bottleneck layer to the output layer (symmetric with the input layer). The nodes of a dimension reduction layer may or may not be symmetrical to the nodes of a dimension restoration layer. The auto encoder may perform a nonlinear dimension reduction. The number of input layers and the number of output layers may correspond to the number of sensors left after preprocessing of the input data. In the auto encoder structure, the number of nodes of the hidden layer included in the encoder decreases as a distance from the input layer increases. When the number of nodes of the bottleneck layer (the layer having the smallest number of nodes located between the encoder and the decoder) is too small, the sufficient amount of information may not be transmitted, so that the number of nodes of the bottleneck layer may be maintained in a specific number or more (for example, a half or more of the number of nodes of the input layer and the like).

The learning of the neural network is for the purpose of minimizing an error of an output. In the training of the neural network, training data is repeatedly input to the neural network and an error of an output of the neural network for the training data and a target is calculated, and the error of the neural network is back-propagated in a direction from an output layer to an input layer of the neural network in order to decrease the error, and a parameter of each node of the neural network is updated. In the case of the unsupervised learning, a correct answer may not be labelled to each training data. That is, for example, in the case of the unsupervised learning related to the data classification, training data that is the input is compared with an output of the neural network, so that an error may be calculated. The calculated error is back-propagated in a reverse direction (that is, the direction from the output layer to the input layer) in the neural network, and a parameter of each of the nodes of the layers of the neural network may be updated according to the backpropagation. A variation rate of the updated parameter of each node may be determined according to a learning rate. The calculation of the neural network for the input data and the backpropagation of the error may configure a learning epoch. The learning rate is differently applicable according to the number of times of repetition of the learning epoch of the neural network. For example, at the initial stage of the learning of the neural network, a high learning rate is used to make the neural network rapidly secure performance of a predetermined level and improve efficiency, and at the latter stage of the learning, a low learning rate is used to improve accuracy.

In the learning of the neural network, the training data may be generally a subset of actual data (that is, data to be processed by using the learned neural network), and thus an error for the training data is decreased, but there may exist a learning epoch, in which an error for the actual data is increased. Overfitting is a phenomenon, in which the neural network excessively learns training data, so that an error for actual data is increased. For example, a phenomenon, in which the neural network learning a cat while seeing a yellow cat cannot recognize cats, other than a yellow cat, as cats, is a sort of overfitting. Overfitting may act as a reason of increasing an error of a machine learning algorithm. In order to prevent overfitting, various optimizing methods may be used. In order to prevent overfitting, a method of increasing training data, a regularization method, a dropout method of omitting a part of nodes of the network during the learning process, and the like may be applied.

Figure 6:
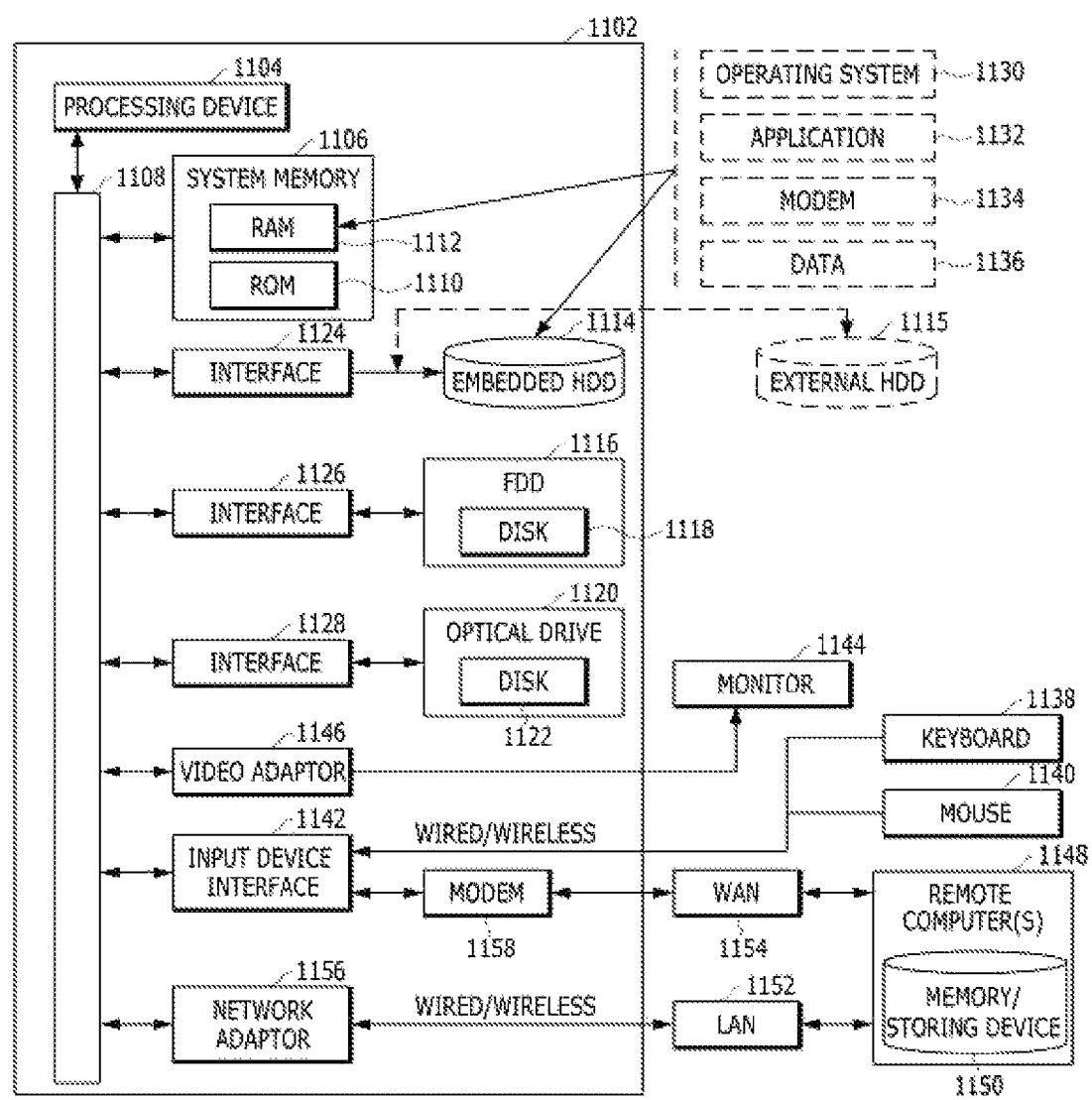
FIG. 6 is a simple and general schematic diagram illustrating an example of a computing environment in which exemplary embodiments of the present disclosure are implementable.

FIG. 6 is a simple and general schematic diagram illustrating an example of a computing environment in which the exemplary embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transmission medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a Random Access Memory (RAM), a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors 110. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an erasable and programmable ROM (EPROM), and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable storage media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, electric fields or particles, optical fields or particles, or a predetermined combination thereof.

Those skilled in the art will appreciate that the various illustrative logical blocks, modules, processors, means, circuits, and algorithm operations described in relationship to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics presented herein.

What is claimed is:

1. A method of setting a model threshold value for detecting an anomaly of a facility monitoring system, the method comprising:
   acquiring sensor data output from each sensor;
   extracting two or more feature values for each of variables included in the sensor data of each sensor;
   acquiring output data by inputting input data which consists of a combination of the extracted feature values to a trained neural network model; and
   comparing the input data and the output data and determining an initial threshold value in a case that there is no failure data based on comparison result values respectively including a Health Index (HI) indicating a device state index, and wherein the initial threshold value is determined based a largest comparison result value among the comparison result values.

2. The method of claim 1, wherein the acquiring of the sensor data includes acquiring sensor data having at least one variable output from each sensor that senses an operation of a device for each sensor.

3. The method of claim 1, wherein the extracting of the two or more feature values includes searching for device state information for the sensor data of each sensor and extracting the two or more feature values for the each of variables included in each sensor in a unit of the device state information.

4. The method of claim 1, wherein the extracting of the two or more feature values includes generating model input values for the number of cases having a feature value for a device state in a unit of a variable included in the sensor data.

5. The method of claim 4, wherein the extracting of the two or more feature values includes, when N device state types are set, generating a model input value for the number of cases having feature values corresponding to the N device state types in a unit of the variable.

6. The method of claim 5, wherein the N device state types are set with user setting values or automatically set through machine learning based on time series data for a predetermined time.

7. The method of claim 1, wherein the extracting of the two or more feature values includes extracting the feature value including an upper limit value corresponding to an Upper Control Limit (UCL) and a lower limit value corresponding to a Lower Control Limit (LCL) in a range of a control limit for the device state feature among the sensor data output from each sensor.

8. The method of claim 1, wherein the extracting of the two or more feature values includes extracting the feature values of at least two of an upper limit value, a lower limit value, a mean, standard deviation, covariance for the sensor data output from each sensor.

9. The method of claim 1, wherein the acquiring of the output data by inputting the input data including an extracted upper limit value and a lower limit value to the trained neural network model includes acquiring the output data by inputting the input data to the trained autoencoder-based neural network model.

10. The method of claim 1, wherein the comparing of the input data and the output data and the determining of the initial threshold value for detecting an anomaly based on the comparison result value includes setting a user set value selected from the calculated comparison result values as the initial threshold value for detecting the anomaly.

11. The method of claim 10, wherein the user setting value is any one of a maximum value, a mean, and a minimum value among the calculated comparison result values.

12. The method of claim 1, wherein the comparison result value calculated by comparing the input data and the output data is calculated based on a reconstruction error of the input data and the output data.

13. The method of claim 1, wherein the determined initial threshold value is set for each device.

14. A computer program stored in a computer readable storage medium, wherein when the computer program is executed by one or more processors, the computer program performs following operations for setting a model threshold value, the operations comprising:
   acquiring sensor data output from each sensor;
   extracting two or more feature values for each of variables included in the sensor data of each sensor;
   acquiring output data by inputting input data which consists of a combination of the extracted feature values to a trained neural network model; and
   comparing the input data and the output data and determining an initial threshold value for detecting an anomaly in a case that there is no failure data based on a comparison result values, respectively including a Health Index (HI) indicating a device state index, and wherein the initial threshold value is determined based a largest comparison result value among the comparison result values.

15. A computing device for providing a method of setting a model threshold value, the computing device comprising:
a processor including one or more cores; and
a memory,
wherein the processor acquires sensor data output from each sensor,
extracts two or more feature values for each of variables included in the sensor data of each sensor,
acquires output data by inputting input data which consists of a combination of the extracted feature value to a trained neural network model, and
compares the input data and the output data and determining an initial threshold value for detecting an anomaly in a case that there is no failure data based on comparison result values respectively including a Health Index (HI) indicating a device state index, and
wherein the initial threshold value is determined based a largest comparison result value among the comparison result values.

* * * * *